(12) United States Patent
Shin

(10) Patent No.: US 9,256,305 B2
(45) Date of Patent: Feb. 9, 2016

(54) REMOTE CONTROL APPARATUS AND METHOD OF AUDIO VIDEO NAVIGATION SYSTEM

(71) Applicant: Hyundai Mobis Co., Ltd., Seoul (KR)

(72) Inventor: Seung Hee Shin, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 40 days.

(21) Appl. No.: 14/082,789

(22) Filed: Nov. 18, 2013

(65) Prior Publication Data

US 2015/0062011 A1 Mar. 5, 2015

(30) Foreign Application Priority Data

Sep. 5, 2013 (KR) ........................ 10-2013-0106645

(51) Int. Cl.
*G06F 3/038* (2013.01)
*G06F 3/0346* (2013.01)
*G06F 3/0488* (2013.01)

(52) U.S. Cl.
CPC ............ *G06F 3/0383* (2013.01); *G06F 3/0346* (2013.01); *G06F 3/04886* (2013.01)

(58) Field of Classification Search
CPC ....... G06F 3/038; G06F 3/0383; G06F 3/048; G06F 3/0488; G06F 3/03545; G06F 3/0346; G06F 3/04886
USPC ........................... 345/158, 179; 715/848, 800
See application file for complete search history.

(56) References Cited

U.S. PATENT DOCUMENTS

| 7,489,308 | B2 * | 2/2009 | Blake ...................... G06F 3/043 178/18.04 |
| 7,961,173 | B2 * | 6/2011 | Boillot .................... G06F 3/017 345/158 |
| 8,593,402 | B2 * | 11/2013 | Stinson, III ............. G06F 3/017 345/517 |
| 2001/0000666 | A1 * | 5/2001 | Wood et al. ................... 345/179 |
| 2002/0140673 | A1 * | 10/2002 | Tanaka .......................... 345/157 |
| 2003/0132950 | A1 * | 7/2003 | Surucu et al. ................. 345/700 |
| 2005/0110778 | A1 | 5/2005 | Ayed |
| 2012/0162214 | A1 * | 6/2012 | Chavez ................... G06F 3/012 345/419 |
| 2013/0293683 | A1 * | 11/2013 | Zhou et al. ...................... 348/47 |

FOREIGN PATENT DOCUMENTS

| KR | 10-2000-0067478 A | 11/2000 |
| KR | 102000006747 A | * 11/2000 |
| KR | 10-2011-0118325 A | 10/2011 |
| KR | 102011011832 A | * 10/2011 |

OTHER PUBLICATIONS

Vidales, Carlos E. "How to Calibrate Touch Screens". Embedded Systems Programming: 32. United Business Media LLC. (Jun. 1, 2002).*

* cited by examiner

*Primary Examiner* — Julie Anne Watko
(74) *Attorney, Agent, or Firm* — NSIP Law

(57) ABSTRACT

Provided are a remote control apparatus and method that remotely control an operation of an AVN system through a virtual touch panel generated by using a stylus pen and a sensor equipped in the AVN system. Therefore, the AVN system is remotely controlled by using the virtual touch panel generated in a vehicle, thus enhancing a user's convenience.

13 Claims, 5 Drawing Sheets

REMOTE CONTROL APPARATUS AND METHOD OF AUDIO VIDEO NAVIGATION SYSTEM

CROSS-REFERENCE TO RELATED APPLICATIONS

This application claims priority under 35 U.S.C. §119 to Korean Patent Application No. 10-2013-0106645, filed on Sep. 5, 2013, the disclosure of which is incorporated herein by reference in its entirety.

TECHNICAL FIELD

The present invention relates to a remote control apparatus and method of an audio video navigation (AVN) system, and more particularly, to an apparatus and method for remotely controlling an AVN system.

BACKGROUND

A related art AVN system, as illustrated in FIG. 1, includes a remote controller application 110, a controller 120, a near field communication module 130, and a display unit 140, and a manipulator 150. The related art AVN system is a smartphone including a near field communication function such as Bluetooth communication, and controls an AVN 200 through the Bluetooth communication.

The remote controller application 110 downloads remote controller screen data from the AVN 200, for displaying a screen and operation state, and transfers the remote screen data to the display unit 140. Also, the remote controller application 110 builds and stores a database of the remote controller screen data. In this case, the download is performed only when remote controller screen data retained by the AVN control apparatus 100 has a version different from that of remote controller screen data retained by the AVN 200.

Moreover, the remote controller application 110 receives a touch panel coordinate value and a button code value from the controller 120 to generate remote controller control information to be transmitted to the AVN 200.

Here, the database of the remote controller screen data includes a plurality of remote controller screen identifiers (IDs) and a remote controller screen that is an image file (a compressed file such as joint photographic experts group (JPEG)) having an AVN menu form and corresponding to each of the remote controller screen IDs.

While the display unit 140 is displaying the remote controller screen, if a user manipulates a touch panel or a button which is included in the manipulator 150, the controller 120 transfers touch panel coordinate value or button value information to the remote controller application 110, and controls the near field communication module 130 so as to enable the Bluetooth communication between the AVN 200 and the remote controller application 110.

The near field communication module 130 transmits the remote controller control information generated by the remote controller application 110 to the AVN 200 through the Bluetooth communication according to control by the controller 120.

The AVN 200 includes a user interface (UI) application 210, a controller 220, a near field communication module 230, and a display unit 240.

The UI application 210 retains the remote controller screen data to be transmitted to the AVN control apparatus 100 and a version of the remote controller screen data, and each time a screen of the display unit 240 is changed, the UI application 210 transmits a remote controller screen ID, which is intended to be displayed, to the AVN control apparatus 100.

Moreover, the UI application 210 analyzes the remote controller control information received from the AVN control apparatus 100 and a current remote controller screen to generate an AVN control command.

The controller 220 controls the AVN 200 so as to perform a relevant operation according to the AVN control command generated by the UI application 210.

The near field communication module 230 receives the remote controller control information from the AVN control apparatus 100 through the Bluetooth communication.

A main feature of the related art will now be described.

The related art AVN control apparatus 100 controls the AVN 200 by using the remote controller application 110, and transmits and receives information/command used to control the AVN 200 by using the near field communication module 130 performing the Bluetooth communication.

The remote controller application 110 downloads the remote controller screen data corresponding to various menus from the AVN 200, and stores the downloaded remote controller screen data.

Here, the download of the remote controller screen data is performed when the remote controller application 110 is executed, and only when the remote controller application 110 and the AVN 200 have different versions, the download of the remote controller screen data is performed.

Moreover, information about manipulation by a user includes a touch panel input (push) coordinate value. Regarding buttons such as increase/decrease, cancel, and end buttons, the manipulation information may include a code value of a corresponding button, in addition to the touch panel input coordinate value. When the AVN 200 displays "navigation destination search/input" or "media file search/input", the manipulation information may include a keyboard code value.

The touch panel input coordinate value and the button code value are transmitted to the AVN 200, analyzed along with the remote controller screen data retained by the AVN 200, and used to generate the AVN control command.

As described above, the related art AVN control apparatus 100 downloads the remote controller application 110 from the AVN 200 to control the AVN 200 from the inside of a vehicle.

SUMMARY

Accordingly, the present invention provides a remote control apparatus and method that remotely control an operation of an AVN system through a virtual touch panel generated by using a stylus pen and a sensor equipped in the AVN system unlike the related art.

In one general aspect, a remote control apparatus of an AVN system includes: a stylus pen; and a central processing unit (CPU) configured to, when a remote control function of remotely controlling the AVN system by using the stylus pen according to a user's manipulation is set, recognize a position of the stylus pen to set the recognized position as a start point of the stylus pen, set a central point and a help point on a basis of information acquired according to the position of the stylus pen being moved from the start point, generate a virtual touch panel to be used for remote control on a basis of the central point and the help point, and remotely control the AVN system according to the user's input using the generated virtual touch panel.

In another general aspect, a remote control method of an AVN system includes: when a remote control function of remotely controlling the AVN system by using a stylus pen according to a user's manipulation is set, receiving an ultrasonic signal transmitted from the stylus pen through an ultrasonic receiver equipped in the AVN system, and recognizing a position of the stylus pen on a basis of the received ultrasonic signal to set the recognized position of the stylus pen as a start point; calculating a movement position of the stylus pen on a basis of information acquired according to the position of the stylus pen being moved from the start point to set a central point and a help point; generating a virtual touch panel to be used for remote control on a basis of the central point and the help point; and remotely controlling the AVN system according to the user's input using the generated virtual touch panel.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
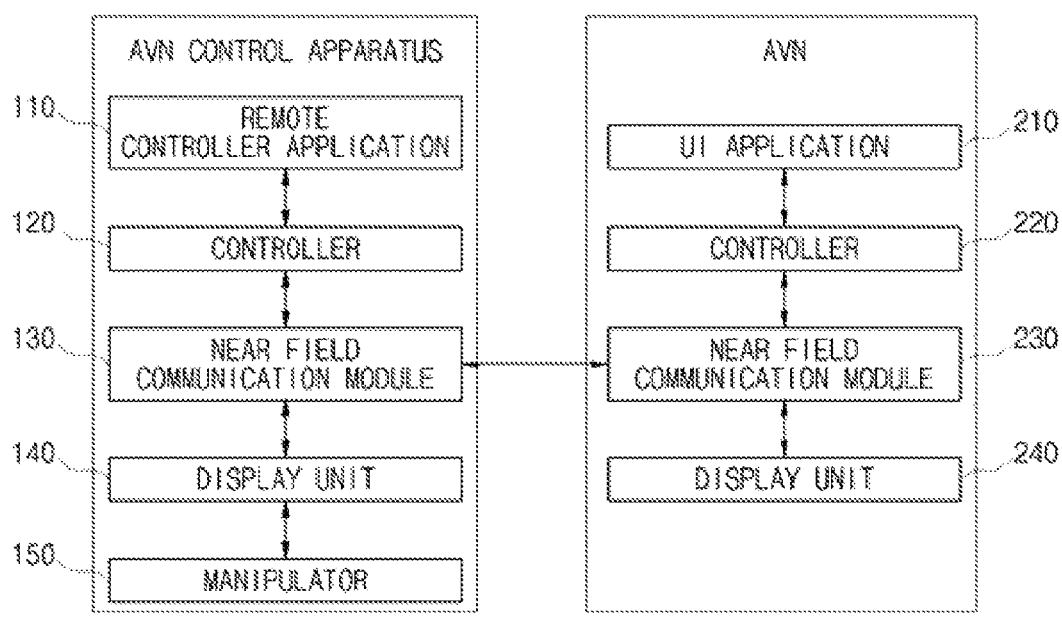
FIG. 1 is a diagram for describing the related art.
Figure 2:
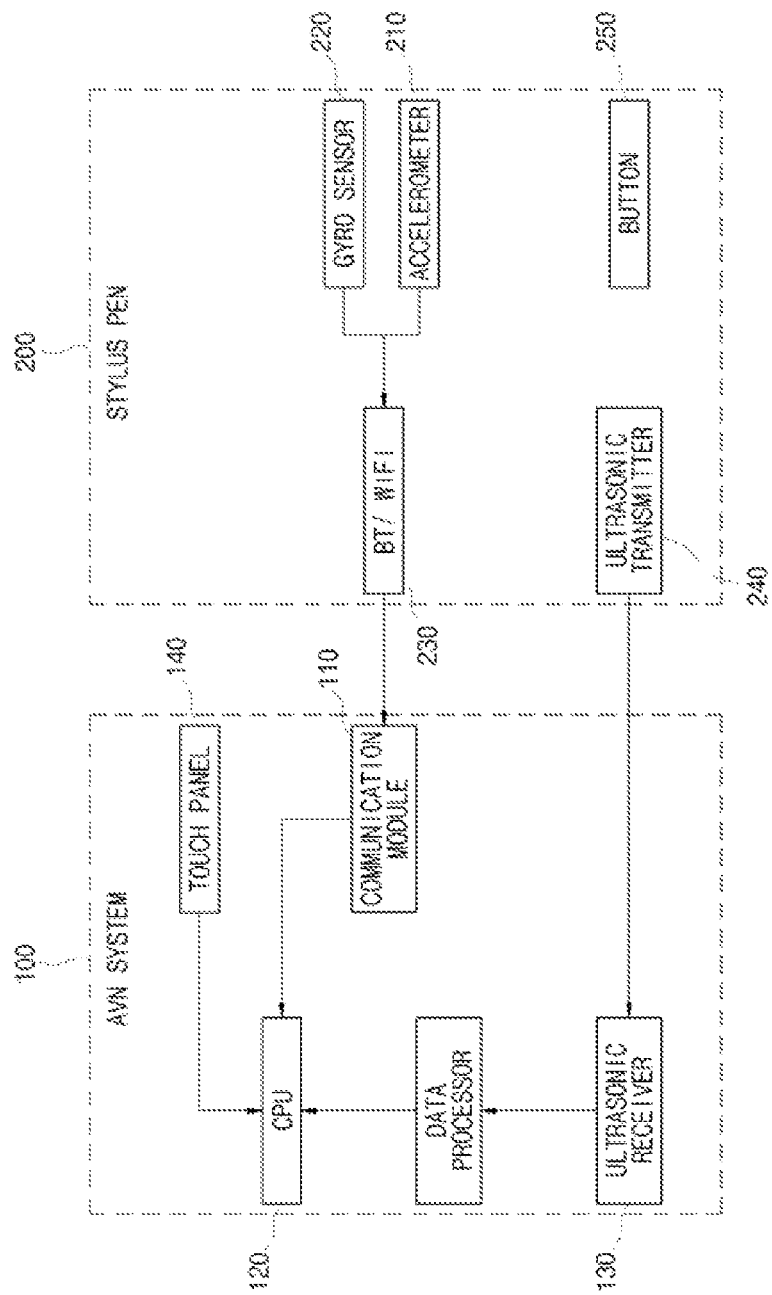
FIG. 2 is a block diagram for describing a remote control apparatus of an AVN system according to an embodiment of the present invention.
Figure 3:
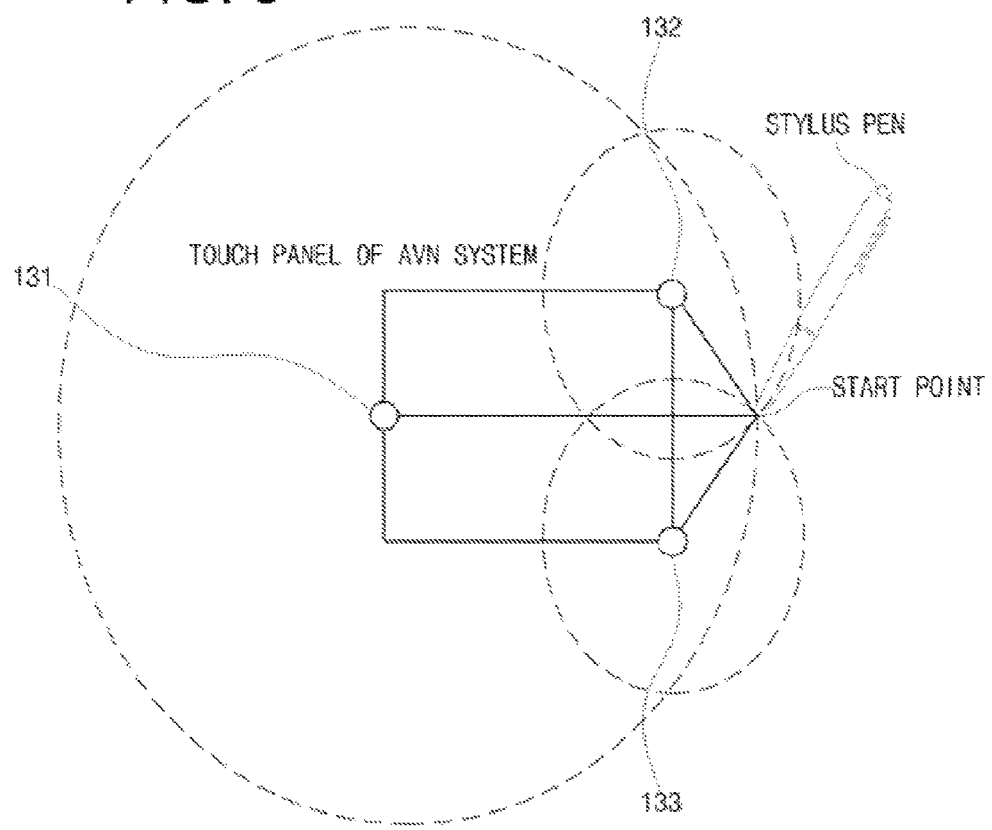
FIG. 3 is a diagram for describing the position recognition principle of a stylus pen.
Figure 4:
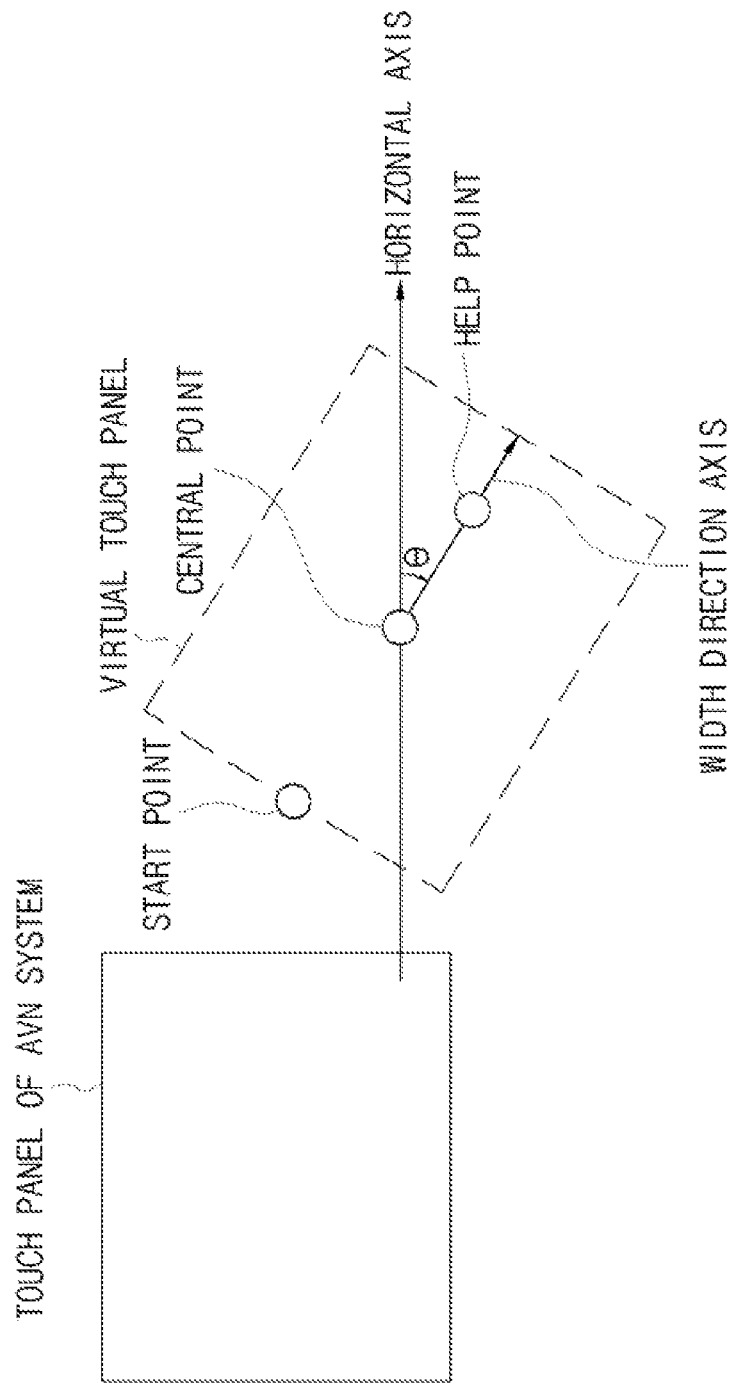
FIG. 4 is a diagram for describing generation of a virtual touch panel.

Hereinafter, a remote control apparatus of an AVN system according to an embodiment of the present invention will be described in detail with reference to FIGS. 2 to 4. FIG. 2 is a block diagram for describing a remote control apparatus of an AVN system according to an embodiment of the present invention. FIG. 3 is a diagram for describing the position recognition principle of a stylus pen. FIG. 4 is a diagram for describing generation of a virtual touch panel.

As illustrated in FIG. 2, the remote control apparatus of the AVN system according to an embodiment of the present invention includes an AVN system 100 and a stylus pen 200. The remote control apparatus remotely controls the AVN system 100 according to a user input which is input by using the stylus pen 200 and a generated virtual touch panel, or remotely controls the AVN system 100 according to a user touch input which is input through a touch panel 140.

The AVN system 100 includes a communication module 110, a central processing unit (CPU) 120, an ultrasonic receiver 130, and the touch panel 140.

The ultrasonic receiver 130 includes a plurality of ultrasonic sensors, which are disposed at specific positions of the AVN system 100 to be separated from each other.

When a remote control request signal is received from the stylus pen 200 according to manipulation of a button by the user, the CPU 120 displays a start point setting request message for the stylus pen 200 on a screen of the AVN system 100.

For example, in a state where the AVN system 100 and the stylus pen 200 are capable of performing Bluetooth (BT)/WiFi communication, ultrasonic communication, or the like, if the user manipulates the button 250 by using a remote control function, the CPU 120 requests, through a screen of the AVN system 100, the user for position recognition of the stylus pen 200 in order for the stylus pen 200 to be located at an ultrasonic-transmittable/receivable distance.

The start point setting request message is displayed on a screen, and then, the stylus pen 200 is located at the ultrasonic-transmittable/receivable distance according to the user's manipulation. In this state, if an ultrasonic signal is transmitted by an ultrasonic transmitter 240, the CPU 120 receives the ultrasonic signal through the plurality of ultrasonic sensors, and calculates a position of the stylus pen 200 on the basis of the received ultrasonic signal to recognize the position of the stylus pen 200. When the position recognition of the stylus pen 200 is completed, a central point setting request message for a virtual touch panel is displayed on the screen of the AVN system 100.

For example, as illustrated in FIG. 3, the CPU 120 receives ultrasonic signals through at least three ultrasonic sensors 131 to 133, and calculates distances between the stylus pen 200 and the ultrasonic sensors 131 to 133 on the basis of the received ultrasonic signals. The CPU 120 generates a plurality of circles that have the respective positions of the ultrasonic sensors 131 to 133 as central values and have the respective distances as radiuses, and recognizes one point, at which the circles overlap each other, as a position (a start point) of the stylus pen 200.

When the stylus pen 200 is moved from the recognized position (the start point) to a specific position by the user according to the displayed central point setting request message, a BT/WiFi module 230 transmits signals which are output from an accelerometer 210 and a gyro sensor 220 according to the position of the stylus pen 200 being moved.

The CPU 120 calculates a movement position of the stylus pen 200 on the basis of the output signals of the accelerometer 210 and gyro sensor 220 which are received through the communication module 110, and recognizes the calculated movement position as a central point of the virtual touch panel. When the recognizing the central point of the virtual touch panel is completed, the CPU 120 displays a help point setting request message for the virtual touch panel on the screen of the AVN system 100.

When the stylus pen 200 is again moved from the recognized central point to position (the start point) to a specific position by the user according to the displayed help point setting request message, the BT/WiFi module 230 transmits signals which are output from the accelerometer 210 and the gyro sensor 220 according to the position of the stylus pen 200 being moved.

The CPU 120 calculates a movement position of the stylus pen 200 on the basis of the output signals of the accelerometer 210 and gyro sensor 220 which are received through the communication module 110, and recognizes the calculated movement position as a help point of the virtual touch panel.

The CPU 120, as illustrated in FIG. 4, connects the recognized central point and help point to generate a with direction axis of the virtual touch panel, measures an angle "θ" between a horizontal axis of the recognized central point and the generated width direction axis with respect to the horizontal axis, and generates the virtual touch panel having a size corresponding to a size of the physical touch panel 140 on the basis of the recognized central point and the measured angle "θ".

The CPU 120 controls the AVN system 100 according to the user's manipulation using the generated virtual touch panel and the stylus pen 200.

The generated virtual touch panel having the size corresponding to the size of the physical touch panel 140 cannot be recognized by the user's eyes, and thus, the CPU 120 displays a virtual touch input of the stylus pen 200, which is input through the generated virtual touch panel, as an arrow or a periodic waveform on the screen of the AVN system 100.

For example, the CPU 120 may display the virtual touch input of the stylus pen 200 as an arrow or a periodic waveform on the screen of the AVN system 100 within a size range of the generated virtual touch panel. When the stylus pen 200 is not within the size range of the virtual touch panel, the CPU 120 does not display the arrow or the periodic waveform, and thus enables the user to recognize the virtual touch panel disposed in a space. In this case, the user may manipulate the AVN system 100 by using the virtual touch input of the stylus pen 200 within the size range of the recognized virtual touch panel, and the CPU 120 may control an operation of the AVN system 100 according to the virtual touch input of the stylus pen 200.

As described above, according to the present invention, the AVN system 100 is remotely controlled by using the virtual touch panel generated in a vehicle, thus enhancing a user's convenience.

Hereinabove, the start point and the central point have been described as different positions, but are not limited thereto. For example, the start point and the central point may be the same position.

Moreover, it has been described above that the virtual touch panel are formed in two-dimensional (2D) plane (width, height) and operates two-dimensionally, but the present invention is not limited thereto. For example, even when the stylus pen 200 is located up to a range of a specific length (+, −) in a height direction with respect to the 2D virtual touch panel, the CPU 120 may determine the 2D virtual touch panel as being moved to a specific position, and display the specific position as an arrow or a periodic waveform on the screen of the AVN system 100. Alternatively, the CPU 120 may enlarge the generated virtual touch panel in a three-dimensional (3D) rectangular parallelepiped, and display a position movement in a height direction (+, −) of the stylus pen 200 on the screen.

Figure 5:
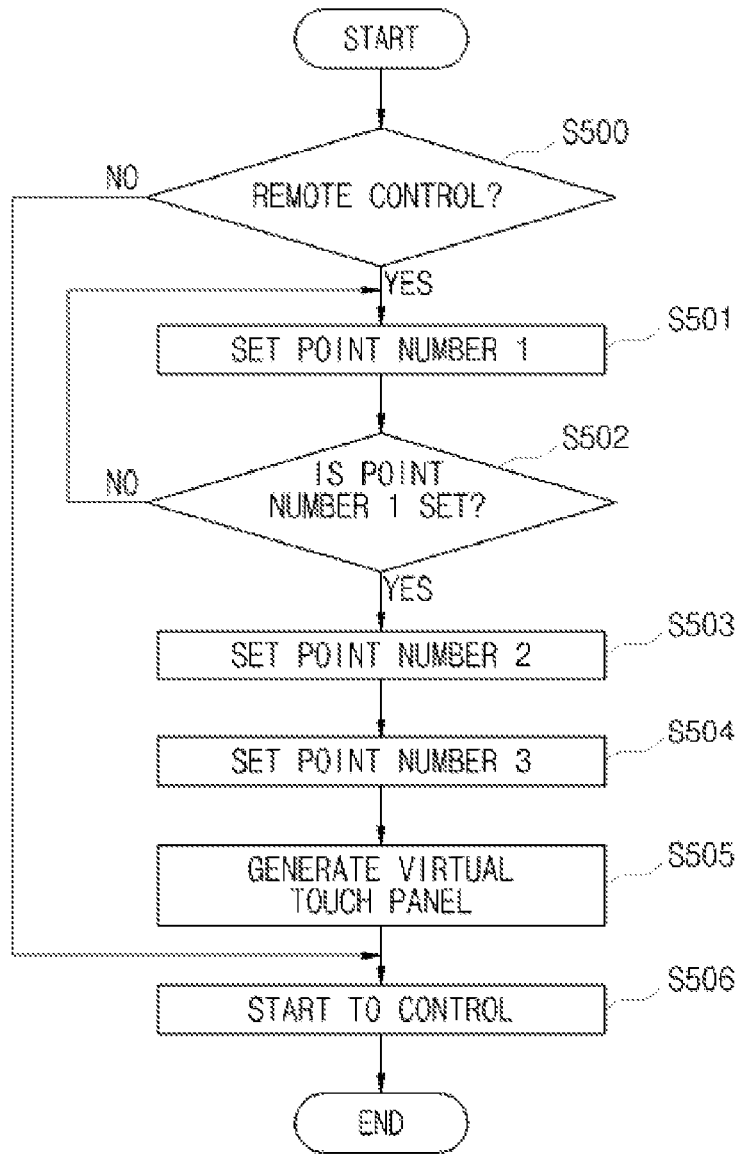
FIG. 5 is a flowchart for describing a remote control method of an AVN system according to an embodiment of the present invention.

Hereinabove, the remote control apparatus of the AVN system according to an embodiment of the present invention has been described with reference to FIGS. 2 to 4. Hereinafter, a remote control method of the AVN system according to an embodiment of the present invention will be described in detail with reference to FIG. 5. FIG. 5 is a flowchart for describing a remote control method of an AVN system according to an embodiment of the present invention.

As illustrated in FIG. 5, when the button 250 attached to the stylus pen 200 is manipulated, the remote control method determines whether to use a remote control function according to the manipulation in operation S500.

When it is determined that the remote control function is set to be used, the remote control method sets a point number 1 in operation S501.

The operation of setting the point number 1 is an operation in which the CPU 120 recognizes a position of the stylus pen 200. Here, the CPU 120 senses a signal (which is generated by the stylus pen 200) through the ultrasonic receiver 130, calculates the position of the stylus pen 200 on the basis of the sensed signal to recognize the position of the stylus pen 200, and determines the recognized position as a start point of the stylus pen 200.

The operation of determining the start point is an operation that measures the position of the stylus pen 200 on the basis of a signal acquired by an ultrasonic sensor or an image sensor to determine a start point of the virtual touch panel. A below-described operation of setting a point number 2 and a point number 3 is an operation that determines the position of the stylus pen 200 by using the gyro sensor 220 and the accelerometer 210 which are equipped in the stylus pen 200, and sets a central point and help point of the virtual touch panel on the basis of the determined position.

The remote control method determines whether the setting of the point number 1 is completed in operation S502. When it is determined that the setting of the point number 1 is completed, the remote control method sets the point number 2 in operation S503, and sets the point number 3 in operation S504.

The point number 2 is the central point of the virtual touch panel, the point number 3 is the help point of the virtual touch panel, and a size (width, height) of the virtual touch panel corresponds to a size of the physical touch panel 140.

In order to increase an accuracy of remote control for the AVN system 100, the virtual touch panel is provided to have a size corresponding to the size of the touch panel 140.

In operation S505, the remote control method connects the recognized central point and help point to generate a with direction axis of the virtual touch panel, measures an angle "θ" between a horizontal axis of the recognized central point and the generated width direction axis with respect to the horizontal axis, and generates the virtual touch panel having the size corresponding to the size of the physical touch panel 140 on the basis of the recognized central point and the measured angle "θ".

After the virtual touch panel is generated, the remote control method may ask the user whether to three-dimensionally enlarge the generated virtual touch panel, through the screen of the AVN system 100.

When the user performs manipulation for three-dimensionally enlarging the physical touch panel 140 or the button 250 as the asked result, the remote control method reflects a height (+z, −z) in the virtual touch panel having a 2D plane (width x, height y) structure so as to three-dimensionally enlarge the 2D-plane virtual touch panel, thereby generating a virtual touch panel having a 3D rectangular parallelepiped (width x, height y) structure.

Here, a length (+z+|−z|) of the height may be previously set in consideration of an internal space of a vehicle. In the 2D-plane virtual touch panel, when a length of the width x is greater than that of the height y, the length (+z+|−z|) of the height may be previously set to a difference value between the length of the width x and the length of the height y.

When the user performs manipulation so as not to enlarge the physical touch panel 140 or the button 250 as the asked result, the remote control method does not perform a 3D enlargement operation.

In operation S506, the remote control method controls the AVN system 100 according to the user's manipulation using the generated virtual touch panel and the stylus panel 200.

For example, the generated virtual touch panel having the size corresponding to the size of the physical touch panel 140 cannot be recognized by the user's eyes, and thus, when the stylus pen 200 is located within a size (width, height) range of the generated virtual touch panel, the remote control method may display a position of the stylus pen 200 as an arrow or a periodic waveform on the screen of the AVN system 100.

That is, the remote control method displays the position of the stylus pen 200 as the arrow or the periodic waveform on the screen of the AVN system 100, and thus enables the user to recognize the virtual touch panel disposed in the space. In this case, the user may manipulate the stylus pen 200 like a wireless mouse within the size of the recognized virtual touch panel, and the remote control method controls the operation of the AVN system 100 according to the user's manipulation using the recognized virtual touch panel.

Moreover, when the stylus pen 200 is located out of the size (width, height) range of the generated virtual touch panel, the position of the stylus pen 200 is not displayed on the screen of the AVN system 100.

That is, when the stylus pen 200 is not within the size range of the generated virtual touch panel, the remote control method does not display an arrow or a periodic waveform on the screen of the AVN system 100. Therefore, the user may recognize that the stylus pen 200 is located out of the size range of the generated virtual touch panel, and thus may again locate the stylus pen 200 within the size range of the generated virtual touch panel.

When it is set that the stylus pen 200 or the remote control function is not used by the user, the remote control method controls the AVN system 100 according to a user touch input using the touch panel 140.

According to the present invention, the AVN system is remotely controlled by using the virtual touch panel generated in a vehicle, thus enhancing a user's convenience.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A remote control apparatus of an audio video navigation (AVN) system, the remote control apparatus comprising:
   a stylus pen; and
   a central processing unit (CPU) configured to, in response to a remote control function of remotely controlling the AVN system by using the stylus pen according to a user's manipulation being set, recognize a position of the stylus pen to set the recognized position as a start point of the stylus pen, set a central point and a help point on a basis of information acquired according to the position of the stylus pen being moved from the start point, generate a virtual touch panel to be used for remote control on a basis of the central point and the help point by connecting the central point and the help point to generate a width direction axis of the virtual touch panel, and measuring an angle between a horizontal axis of the central point and the width direction axis, and remotely control the AVN system according to the user's input using the generated virtual touch panel.

2. The remote control apparatus of claim 1, further comprising:
   an ultrasonic receiver configured to receive an ultrasonic signal generated from the stylus pen; and
   a communication module configured to receive information transmitted from the stylus pen through near field communication,
   wherein the CPU recognizes the position of the stylus pen on a basis of the ultrasonic signal received through the ultrasonic receiver to set the recognized position as the start point, and in response to the stylus pen being moved from the recognized position to specific positions twice, the CPU calculates movement positions of the stylus pen on a basis of two pieces of information received through the communication module to respectively set the calculated positions as the central point and the help point, and generates the virtual touch panel on a basis of the central point and the help point.

3. The remote control apparatus of claim 2, wherein,
   the ultrasonic receiver comprises at least three ultrasonic sensors, and
   the CPU receives ultrasonic signals from the at least three ultrasonic sensors, calculates respective distances between the stylus pen and the ultrasonic sensors on a basis of the received ultrasonic signals, generates a plurality of circles that have the respective positions of the ultrasonic sensors as central values and have the respective distances as radiuses, and recognizes one point, at which the circles overlap each other, as the position of the stylus pen.

4. The remote control apparatus of claim 2, wherein,
   in response to a remote control request signal being received from the stylus pen according to the user's manipulation, the CPU displays a start point setting request message for the stylus pen on a screen of the AVN system,
   in response to the stylus pen being located at an ultrasonic-transmittable and ultrasonic-receivable distance by the user according to the start point setting request message and the ultrasonic signal being received from the stylus pen through the ultrasonic receiver, the CPU calculates the position of the stylus pen on a basis of ultrasonic signals respectively received from at least three ultrasonic sensors to recognize the position of the stylus pen, and displays a central point setting request message for a virtual touch panel on the screen of the AVN system,
   in response to the stylus pen being moved from the recognized position to a specific position by the user according to the displayed central point setting request message, the CPU calculates a movement position of the stylus pen on a basis of signals, which are respectively received from an accelerometer and a gyro sensor of the stylus pen through the communication module according to the position of the stylus pen being moved, to recognize the movement position as a central point of the virtual touch panel, and displays a help point setting request message for the virtual touch panel on the screen of the AVN system,
   in response to the stylus pen being moved from the recognized central point to a specific position by the user according to the displayed help point setting request message, the CPU calculates a movement position of the stylus pen on a basis of a signal, which is received through the communication module according to the position of the stylus pen being moved, to recognize the movement position as a help point of the virtual touch panel, and the CPU generates the virtual touch panel on a basis of the recognized central point and help point.

5. The remote control apparatus of claim 1, wherein the CPU generates a virtual touch panel having a size proportional to a size of a physical touch panel on a basis of the set central point and the measured angle, and controls the AVN system according to the user's manipulation using the generated virtual touch panel and the stylus pen.

6. The remote control apparatus of claim 1, wherein,
in response to the stylus pen being located within a size range of the virtual touch panel which is generated to be proportional to a size of a physical touch panel of the AVN system, the CPU displays the position of the stylus pen as an arrow or a periodic waveform on a screen of the AVN system, and
in response to the stylus pen being located out of the size range of the virtual touch panel, the CPU does not display the arrow or the periodic waveform corresponding to the position of the stylus pen.

7. The remote control apparatus of claim 1, wherein the start point and the central point are disposed at a same position.

8. The remote control apparatus of claim 1, wherein the CPU asks the user whether to three-dimensionally enlarge the generated virtual touch panel in response to generating the virtual touch panel, and in response to the user agreeing to three-dimensionally enlarge the generated virtual touch panel, setting a length of a three-dimensional depth to a difference value between a length of a width and a length of a height.

9. A remote control method of an audio video navigation (AVN) system, the remote control method comprising:
in response to a remote control function of remotely controlling the AVN system by using a stylus pen according to a user's manipulation is set, receiving an ultrasonic signal transmitted from the stylus pen through an ultrasonic receiver equipped in the AVN system, and recognizing a position of the stylus pen on a basis of the received ultrasonic signal to set the recognized position of the stylus pen as a start point;
calculating a movement position of the stylus pen on a basis of information acquired according to the position of the stylus pen being moved from the start point to set a central point and a help point;
generating a virtual touch panel to be used for remote control on a basis of the central point and the help point by connecting the central point and the help point to generate a width direction axis of the virtual touch panel, and measuring an angle between a horizontal axis of the central point and the width direction axis; and
remotely controlling the AVN system according to the user's input using the generated virtual touch panel.

10. The remote control method of claim 9, wherein,
the ultrasonic receiver comprises at least three ultrasonic sensors, and
the setting of a start point comprises:
receiving ultrasonic signals from the at least three ultrasonic sensors;
calculating respective distances between the stylus pen and the ultrasonic sensors on a basis of the received ultrasonic signals; and
generating a plurality of circles that have the respective positions of the ultrasonic sensors as central values and have the respective distances as radiuses, and recognizing one point, at which the circles overlap each other, as the position of the stylus pen.

11. The remote control method of claim 9, further comprising:
in response to a remote control request signal being received from the stylus pen according to the user's manipulation, displaying a start point setting request message for the stylus pen on a screen of the AVN system;
in response to recognizing the position of the stylus pen being completed after the start point setting request message is displayed, displaying a central point setting request message for a virtual touch panel on the screen of the AVN system; and
in response to setting a central point of the virtual touch panel being completed after the central point setting request message is displayed, displaying a help point setting request message for the virtual touch panel on the screen of the AVN system.

12. The remote control method of claim 9, wherein the generating of a virtual touch panel comprises:
generating a virtual touch panel having a size proportional to a size of a physical touch panel on a basis of the set central point and the measured angle.

13. The remote control method of claim 9, further comprising:
in response to the virtual touch panel being generated, asking the user whether to three-dimensionally enlarge the generated virtual touch panel; and
in response to three-dimensional (3D) enlargement being selected by the user as the asked result, reflecting a predetermined height in the virtual touch panel having a two-dimensional (2D) plane structure for three-dimensionally enlarging the 2D-plane virtual touch panel to generate a virtual touch panel having a 3D rectangular parallelepiped structure.

* * * * *